(12) United States Patent
Ahmed et al.

(10) Patent No.: US 7,388,693 B2
(45) Date of Patent: Jun. 17, 2008

(54) SYSTEM AND METHODS FOR MULTIPLE IMAGING ELEMENT SCANNING AND COPYING

(75) Inventors: Mohamed N. Ahmed, Louisville, KY (US); Chengwu Cui, Lexington, KY (US); Michael E. Lhamon, Lexington, KY (US); Shaun T. Love, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1135 days.

(21) Appl. No.: 10/376,174

(22) Filed: Feb. 28, 2003

(65) Prior Publication Data
US 2004/0169870 A1 Sep. 2, 2004

(51) Int. Cl.
*H04N 1/46* (2006.01)
*H04N 1/04* (2006.01)

(52) U.S. Cl. ............... 358/512; 358/513; 358/514; 358/482

(58) Field of Classification Search .......... 358/512, 358/513, 514, 482, 483; 382/312; 348/302
See application file for complete search history.

(56) References Cited

U.S. PATENT DOCUMENTS

| | | | |
|---|---|---|---|
| 4,393,410 A | 7/1983 | Ridge et al. | |
| 4,730,212 A | 3/1988 | Wojcik et al. | |
| 4,811,114 A | 3/1989 | Yamamoto et al. | |
| 5,138,167 A | 8/1992 | Barnes | |
| 5,159,455 A | 10/1992 | Cox et al. | |
| 5,161,008 A | 11/1992 | Funk | |
| 5,192,968 A | 3/1993 | Kishida et al. | |
| 5,267,335 A * | 11/1993 | Mita | ............ 382/318 |
| 5,276,530 A | 1/1994 | Siegel | |
| 5,282,043 A | 1/1994 | Cochard et al. | |
| 5,309,496 A | 5/1994 | Winsor | |
| 5,325,205 A | 6/1994 | De Rooy | |
| 5,359,207 A | 10/1994 | Turner | |
| 5,396,418 A | 3/1995 | Heuscher | |
| 5,416,609 A | 5/1995 | Matsuda et al. | |
| 5,450,503 A | 9/1995 | Ogino et al. | |
| 5,461,425 A | 10/1995 | Fowler et al. | |

(Continued)

OTHER PUBLICATIONS

Sunetra K. Mendis, Sabrina E. Kemeny & Eric R. Fossum, "A 128x128 CMOS Active Pixel Image Sensor for Highly Integrated Imaging Systems," IEEE 1993, p. 22.6.1-22.

(Continued)

*Primary Examiner*—Houshang Safaipour

(57) ABSTRACT

A scanning or copying system can include imaging elements and one or more system processors that are programmed or adapted to perform image processing methods and algorithms on image data, and in some instances, to enhance the image. Image data is acquired using imaging elements. Some imaging elements may have overlapping or rotated fields of view or employ differing resolutions. For each imaging element, its output is recombined together with the output of one or more other imaging elements. To perform the recombination, the system can extract features in an overlapping region and match these features in multiple images. In some instances, the features matched can be edges. Alternatively, the recombination can be performed by positioning each subimage with respect to a larger image through image matching and location techniques. Parameters from the recombined image can be extracted and these parameters can be used to correct for geometrical and spatial distortions and thereby enhance the image.

49 Claims, 9 Drawing Sheets

U.S. PATENT DOCUMENTS

| | | |
|---|---|---|
| 5,461,653 A | 10/1995 | Parker |
| 5,493,595 A | 2/1996 | Schoolman |
| 5,497,236 A | 3/1996 | Wolff et al. |
| 5,499,051 A | 3/1996 | Suda et al. |
| 5,523,786 A | 6/1996 | Parulski |
| 5,577,130 A | 11/1996 | Wu |
| 5,585,926 A | 12/1996 | Fujii et al. |
| 5,585,945 A | 12/1996 | Ikeda et al. |
| 5,654,807 A | 8/1997 | Miyaza |
| 5,659,404 A | 8/1997 | Matsuda |
| 5,668,595 A | 9/1997 | Katayama et al. |
| 5,703,965 A | 12/1997 | Fu et al. |
| 5,751,446 A | 5/1998 | Fujioka |
| 5,760,925 A | 6/1998 | Saund et al. |
| 5,764,379 A | 6/1998 | Matsuda et al. |
| 5,764,383 A | 6/1998 | Saund et al. |
| 5,768,443 A | 6/1998 | Michael et al. |
| 5,808,756 A | 9/1998 | Matsuda |
| 5,835,241 A | 11/1998 | Saund |
| 5,886,342 A | 3/1999 | Matsui |
| 5,978,102 A | 11/1999 | Matsuda |
| 5,995,245 A | 11/1999 | Moro |
| 6,002,743 A | 12/1999 | Telymonde |
| 6,009,214 A * | 12/1999 | Suggs .................. 382/312 |
| 6,014,470 A | 1/2000 | Matsuda |
| 6,041,146 A | 3/2000 | Kamon et al. |
| 6,072,603 A | 6/2000 | Parks |
| 6,181,388 B1 | 1/2001 | Nomura |
| 6,285,470 B1 | 9/2001 | Matsuda et al. |
| 6,289,121 B1 | 9/2001 | Abe et al. |
| 6,320,618 B1 * | 11/2001 | Aoyama ................ 348/335 |
| 6,323,963 B1 | 11/2001 | Takahashi |
| 6,330,050 B1 | 12/2001 | Takahashi et al. |
| 6,961,157 B2 * | 11/2005 | Tandon et al. .......... 358/512 |

OTHER PUBLICATIONS

Sunetra Mendis, Sabrina E. Kemeny, and Eric R. Fossum, "CMOS Active Pixel Image Sensor," Briefs, IEEE Transactions on Electron Devices, vol. 41 (No. 3), p. 452-453, (Mar. 1994).

P.B. Denyer, D. Renshaw, Wang Guoyu, Lu Mingying, "CMOS Image Sensors for Multimedia Applications," IEEE 1993 Custom Integrated Circuits Conference, p. 11.5.1-11.

Boyd Fowler, Abbas El Gamal, David X.D. Yang, "A CMOS Area Image Sensor with Pixel-Level A/D Conversion," ISSCC94 / Session 13 / Neural Networks and Image Sensors, IEEE Int'l Solid-State Circuits Conference, p. 226-227,(1994).

* cited by examiner

SYSTEM AND METHODS FOR MULTIPLE IMAGING ELEMENT SCANNING AND COPYING

BACKGROUND

The present invention is directed to systems and methods for scanning documents. More specifically, without limitation, in one embodiment, the present invention relates to systems and methods that employ a plurality of imaging elements that can capture an upward facing document under normal illumination, process plural images, correct for geometrical and other forms of distortions, and reconstruct the image for scanning, displaying, copying, distributing, and storage.

Traditional scanning or copying systems require the document to be placed upside down on a transparent platform. Under the platform, a special illumination system illuminates lines or portions of the document sequentially while imagers or light sensors capture the reflected light to form an undistorted and balanced image of the document. The use of motion components to facilitate the scanning process often hinders performance and adds to both the initial cost and maintenance cost of the system. The traditional design renders use of scanning and copying equipment counterintuitive and inconvenient to use. For example, when a user needs to copy from a thick bound volume of a journal, the user may need to turn the volume upside down and apply sufficient forces with both hands so that the central margins of the pages lie as flat as possible and are therefore not severely distorted and defocused. This process may also create stress and damage to the volume.

These and other disadvantages of known techniques are solved in one embodiment of the present invention by the use of an opto-mechanical imaging system employing multiple imaging elements in conjunction with image processing algorithms. For example, when a user reads a document such as a book, the imaging element array can capture the images of opened pages of the book and processes the images to reconstruct the image to ideal format and clarity. The user need only turn the pages and command the scanning or copying with the disclosed system. The disclosed system may be combined with a system for displaying or printing.

The rapid development of image sensors built using newer technologies such as CCD and CMOS technologies has led to digital sensors that are orders of magnitude more sensitive. Additionally, these sensors are relatively inexpensive, particularly when manufactured in high volume. High-performance hardware to facilitate post-processing has also become inexpensive.

Systems that employ a "camera-like" setup to capture a document such as a bound book for scanning and copying have been the subject of at least one U.S. Patent (U.S. Pat. No. 5,969,795 to Honda). However, one embodiment of the present invention discloses an innovative scheme that employs a plurality of imagers, image processing algorithms, and processing hardware in such a way that a high-quality, high-performance, yet inexpensive, easy to use device can be made to scan or copy a document face-up.

SUMMARY

In one embodiment, the present invention is directed to systems and methods of using an array of imaging elements to scan an upward facing document under normal illumination. The image generation system includes three components: an opto-mechanical system, an image processing hardware configuration, and image processing algorithms and methods.

In some embodiments, the present invention uses an array of imaging elements with overlapping view fields, although other embodiments need not be limited to an array configuration of image elements. The opto-mechanical system includes an imaging system. The imaging system includes the imaging elements that image the document. In one embodiment, the imaging system includes an array of imaging elements, such as CCD or CMOS imagers and corresponding focusing optics. In some embodiments, the opto-mechanical system can also include an illumination system to provide adequate uniform illumination of the document to be imaged. This illumination system can, in some embodiments, be integrated with the imaging system as an arrangement (such as an array) of illumination elements that is housed with the imaging elements. In one embodiment, the imaging elements and illumination elements are arranged in a manner allowing easy rearrangement by the user to generate the best quality and/or resolution for a document of a given size.

One embodiment of the present invention is particularly useful for the scanning of open books or other objects that do not naturally lie flat. To better image such surfaces, in some embodiments, the imaging elements can also be angled such that the areas imaged by adjacent imaging elements are not overlapping. This angling of the imaging elements serves the function of allowing the imaging of angled surfaces without, or with reduced, distortion and defocus. In some embodiments, the angling of individual and/or groups of imaging elements, and/or illumination elements when present, can be controlled by the user in an arrangement to improve imaging quality.

In some embodiments, the imaging elements can be configured at different resolutions with differing viewing areas. For example, an imaging element can have an area of view covering the entire scan surface at a first resolution. Additional imaging elements can be positioned central to each of several quadrants that comprise the entire scan surface having an area of view covering each respective quadrant at a second resolution. Additional subdivision of quadrants can occur with other imaging elements covering the subdivisions. Alternate embodiments can use differing number of quadrants and imaging elements. The resolution of each imaging element can be selectively controlled to set resolution and areas of view based upon scanning requirements.

The present invention can include image-processing hardware that receives data from the imaging elements. In different embodiments, the image-processing hardware can include a range of parallelization. In one embodiment, a single processing element receives data in a serial fashion from the imaging elements. This data from individual imaging elements is recombined and further processed to generate the final image. In a second embodiment, a processing element such as a digital signal processing (DSP) element, an application specific integrated circuit (ASIC), a field programmable gate array (FPGA), or a programmed general purpose processor is allocated for a grouping of imaging elements; for example, in an array configuration one processing element can be allocated per row, column, row portion, column portion or subarray of predetermined row and column size. In such an embodiment, group-wise stitching, recombination, and processing can occur in each of these elements with processed groups and extracted features, parameters and/or other appropriate statistics being passed to another processing element for further processing of the groups. Finally, in a third embodiment, each imaging element incorporates a processing element that performs localized processing of locally derived data and can perform integration of locally processed data from neighboring imaging elements. Global processing of the image, if needed, can occur via a central processing element. In all embodiments, imaging elements can be calibrated at the pixel level.

Finally, software based processing of the images can occur. The software process can recombine or stitch the partial images generated from each imaging element through a registration process. Feature extraction can occur for each partial image, and the partial images can be stitched together through identifying the same feature in adjacent partial images. In one embodiment, edges form the feature set used for the registration and stitching processes. The registration algorithm for recombining together co-planar partial images can account for potential illumination and curvature artifacts. In some embodiments, the present invention can join images by identifying joints by comparing partial images with a lower resolution image that includes the overlap region between the partial images. Alternatively, the present invention can use the approach disclosed in expired U.S. Pat. No. 4,393,410 to Ridge et al., the content of which is incorporated herein by this reference.

The fully recombined image can be further processed to extract parameters for correcting geometrical, spatial and lighting artifacts, and these parameters can then be used for image correction. Further image enhancement to improve output quality can also occur.

Additional advantages of certain embodiments of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Figure 1:
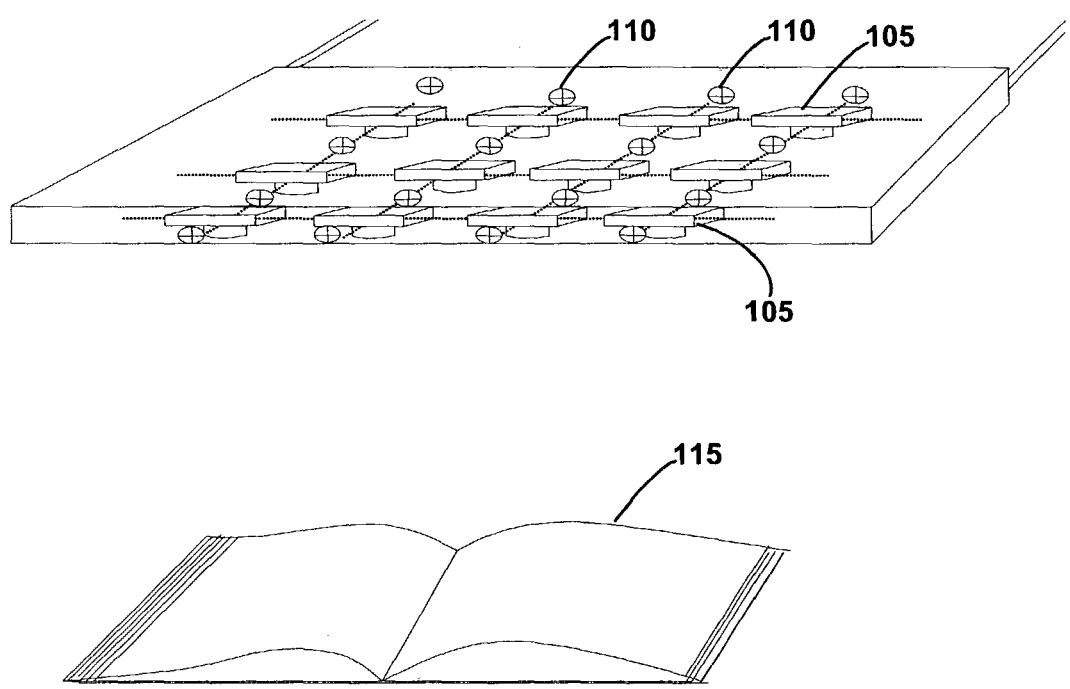
FIG. 1 depicts a configuration of the imaging elements and the illumination sources in relation to the document to be scanned or copied.

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

As used herein, the following terms shall be defined in accordance with the definitions provided:

Imaging element: a component that forms an image of a physical area. It may comprise an optical portion and a sensor (imager) portion. A digital camera is an example of an imaging element.

Area of View: the physical area that is imaged by the optics of an imaging element onto the imager and recorded by the imager. It is equivalent to field of view.

Resolution: the capability of an imaging system to record or render image details, represented by the number of pixels in the image space representing unit distance in the object space. Assuming sufficient optical resolution with the corresponding optical components, resolution is determined by the number of photosites in the photo sensor array or imager.

Subset: any combination of any number of elements from a larger set, including but no limited to the null and empty sets.

Opto-Mechanical System

In some embodiments, the opto-mechanical system includes two major subsystems as shown in FIG. 1. These subsystems might include an imaging subsystem that includes a set of imaging elements 105, such as that depicted in an array configuration, and an illumination subsystem, such as with depicted integrated light sources 110, such as light emitting diodes (LEDs). The imaging elements can be arranged in any suitable configuration appropriate for the imaging task to be performed; in some exemplary embodiments, the imaging elements are arranged in a two-dimensional configuration. Many such embodiments configure the imaging elements in a two dimensional array; although other embodiments could include a concentric circle or other suitable arrangement. In other embodiments, the imaging elements need not be confined to two dimensions but could be arranged in a suitable three-dimensional configuration. Other embodiments need not include an illumination subsystem, or may optionally provide illumination through a separately provided system. The configuration of imaging elements can consist of a sufficient number of imaging elements so that the resolution of the acquired images is adequate for the intended application purpose. If the desired scan or copy resolution is R pixels/inch (assuming uniform resolution for both horizontal and vertical dimension), the number of useful pixels of the imaging element is P (assuming square pixel), and the size of the to be scanned document 115 is S1×S2 inches, then the minimum number of imaging elements needed can be given by $(S1 \times S2 \times R^2)/P$. This formulation for the minimum number of imaging elements is intended as a non-limiting example and other formulations are possible.

Any suitable type, or combination of types, of image forming devices can serve as imaging elements. In some exemplary embodiments, CCD imagers, CMOS imagers and/or combinations thereof can serve as the imaging elements. The optical lenses for any imager can be a telephoto lens such that it covers a portion of the document with minimum distortion or other optical aberrations. Other types of lenses can be used as appropriate. To provide adequate uniform illumination for the imaging elements array, the illumination system can be housed with the imaging elements. Alternatively, it can be housed externally. Some exemplary embodiments do not include an illumination system or subsystem.

In some embodiments, the illumination system can consist of an arrangement of LEDs. In one embodiment, the illumination system can be arranged in one or more arrays. Selection of the LEDs can be based on the sensitivity of the imagers. As a non-limiting example, for monochromatic scanning and copying, infrared LEDs and infrared sensitive imagers can be used. Such an array, or arrays, of LEDs or other types of efficient light sources can form an illumination subsystem.

In other embodiments, the illumination system can use one or more fluorescent lamps to provide normal illumination for the user and/or the imaging elements. Selection of fluorescent lamps can be based on their spectral compositions. As a non-limiting example, to achieve greater efficiency, the spectral energy distribution curves of the fluorescent lamps can be chosen to overlap with the spectral sensitivity curves of the imagers.

The imager and illumination systems can be constructed or arranged so that they can be conveniently arranged by the user so that a desired resolution can be achieved. The arrangement can be based on the dimensions of the document to be scanned or copied or the orientation and/or known/detected irregularities of the document. For typical applications such as scanning and copying of bound books 115, the configuration of FIG. 1 can be used. In some embodiments, the imaging elements can be arranged such that they are not more than two elements deep in a given dimension. Thus, the matrix could be a 2×N or an N×2 matrix where N is an integer greater than or equal to one. Those skilled in the art will realize that other configurations of imaging elements are possible.

In some embodiments, the imaging elements can be configured at different resolutions with differing areas of viewing. For example, a central imaging element can have an area of view covering the entire scan surface at a first resolution. Four additional imaging elements can be positioned central to each of four equally sized quadrants that comprise the entire scan surface having an area of view covering each respective quadrant at a second resolution. Additional subdivision of quadrants can occur with centralized imaging elements covering the subdivisions. Alternate embodiments can use differing numbers of quadrants and imaging elements. Additionally, other geometric formulations are possible such as concentric circles of imaging elements. The resolution of each imaging element can be selectively controlled to set resolution and areas of view based upon scanning requirements.

Figure 10:
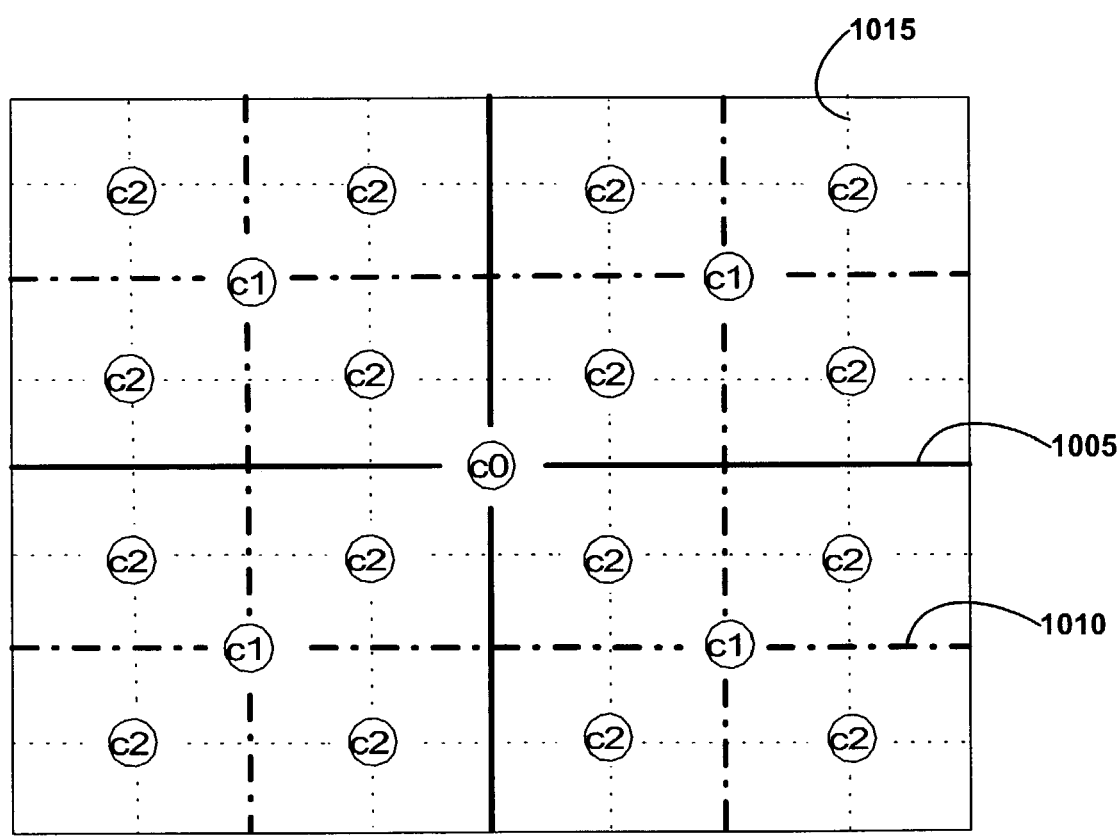
FIG. 10 depicts a configuration of an imaging elements including imaging elements of differing areas of view, as used in some embodiments of the present invention.

In some embodiments, the imaging elements can be configured in such a manner so that some imaging elements can be designated for a specific task. As a non-limiting example, FIG. 10 shows one such embodiment. The configuration of FIG. 10 shows the Area of View (AOV) divided into four sub areas. The "LEVEL 0" division 1005 creates a center of the whole AOV for imaging element c0 and four sub AOV imaging elements imaged by imaging elements at positions c1. The "LEVEL 1" 1010 division further divides each of the four sub AOVs into four additional sub AOVs, creating four new positions for four c1 imaging elements. Similarly, further dividing at "LEVEL 2" 1015 creates center positions for 16 imaging elements c2 and 64 sub AOVs. Following this approach, any resolution can be obtained by further dividing the sub AOVs according to application requirements.

Imaging elements c0, c1, c2, etc. can be of the same or different sensor resolutions. Additionally, different types of optical elements can be included in the imaging elements to generate different, potentially controllably different, areas of view. As a result of differences in the area of view, the captured images can have different resolutions. Images at lower resolutions can provide data for global document surface structure and luminance corrections, image stitching verification, and other image processing as appropriate. This processing can be accomplished at a faster rate due to the design of the system. The system architecture can also provide fast preview images or final scanned images at lower resolutions.

Images at multiple resolutions acquired individually can provide useful information for improved and accelerated data processing to assemble any final high resolution image.

Figure 8:
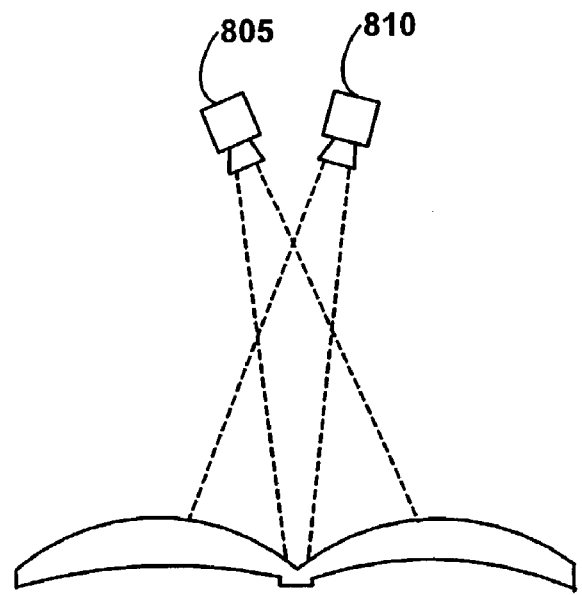
FIG. 8 depicts two imaging elements oriented at opposite angles, as used in some embodiments of the present invention.
Figure 9:
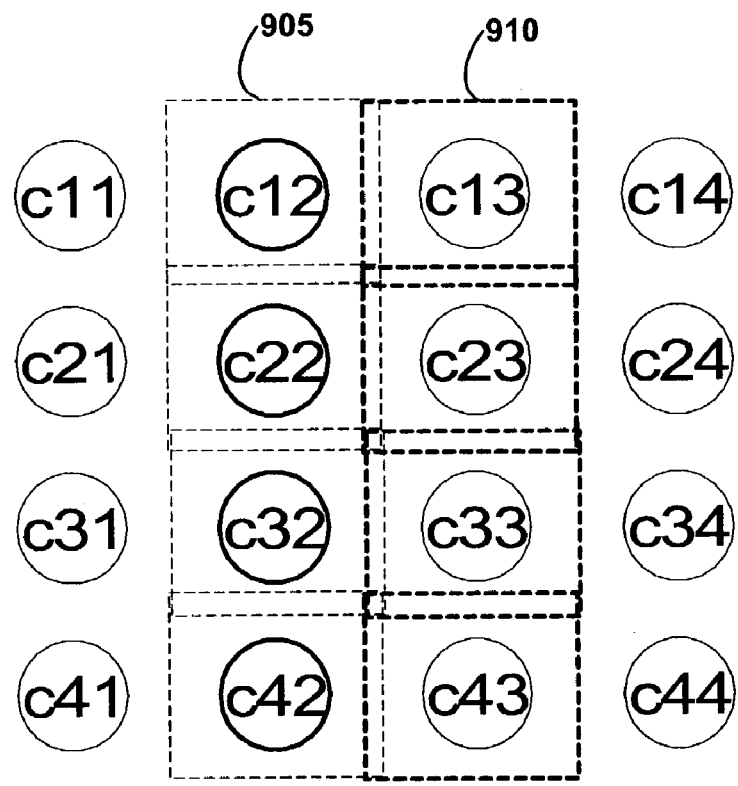
FIG. 9 depicts an exemplary 4×4 array configuration of imaging elements.

When scanning or copying a bound volume such as a book, the exposed pages are usually not flat. The shapes of the two exposed pages of an opened book usually depend on the thickness of the book and the binding method used. When a book is scanned or copied with a conventional face-down scanner, such binding structure can create a distorted and defocused section in the reproduced pages. To overcome this and other limitations, one embodiment of the present invention can arrange the middle two or more columns of imaging elements to orient in a manner that reduces such distortion and defocus. In one exemplary embodiment, the middle two columns of imaging elements can be oriented at opposite angles. FIG. 8 shows two imaging elements 805, 810 oriented such that they have overlapping areas of view. In another exemplary embodiment shown in FIG. 9, the imaging elements are arranged in an array of the dimensions of 4×4. As a result of this orientation, column 2 905 and column 3 910 have swapped areas of view. As shown in FIG. 9, the dotted borders around each imaging element represent the area of view of its corresponding imaging element in the other column. Such orientation arrangement can be conveniently practiced with a manual or automated orientation adjustment system. Mechanisms that automatically detect the location of the spine of a book that is being imaged can be used. Such mechanisms can use well-known image processing techniques for object detection and location such as described below. This positional information can be used to control the angling of different imaging elements.

Image Processing Hardware Implementation

There exist numerous strategies in hardware and software for further processing of output from the imagers in the above described opto-mechanical system. These strategies are dependent on the degree of image processing parallelization.

In at least one embodiment, the image enhancement system includes a system processor including one or more processing elements. The term processing element (PE) may refer to (1) a process running on a particular piece, or across particular pieces, of hardware, (2) a particular piece of hardware, or either (1) or (2) as the context allows. Each processing element may be supported via a standard general purpose processor such as an Intel-compatible processor platform preferably using at least one PENTIUM or CELERON (Intel Corp., Santa Clara, Calif.) class processor; alternative processors such as UltraSPARC (Sun Microsystems, Palo Alto, Calif.) could be used in other embodiments. ARM and/or MIPS RISC processors could also be used in some embodiments.

In addition, or instead, one or more special purpose processors such as digital signal processing (DSP) elements can be included. A DSP element may be one or more of a Texas Instruments DSP such as TMS320C6411, TMS320VC5501 or Analog Devices DSP such as ADSP-21532S. DSP elements, and processors with similar capabilities, are processing elements (PEs) for the purposes of this specification.

Figure 6:
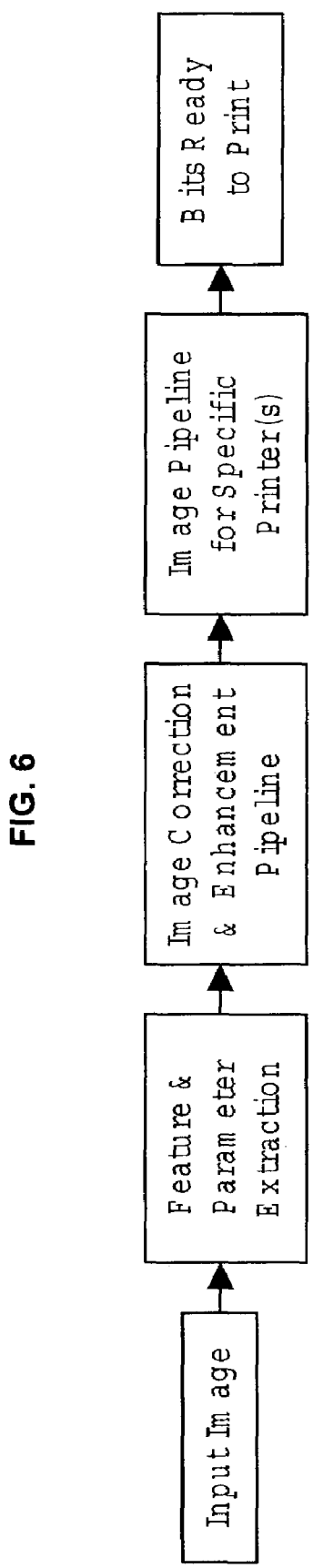
FIG. 6 is a flow chart of an approach that can be used to perform image processing according to the present invention.

FIG. 6 is a block diagram depicting elements in one exemplary embodiment performing several image processing steps. The depicted image-processing pipeline can implement various feature and parameter extraction, image correction and enhancement methods. Depending on the embodiment, one or more processing blocks may be implemented with one or more processing elements depending on the performance of the processing elements and hardware architecture.

The system processor, or the processing elements thereof, may also include one or more application specific integrated circuits (ASICs) and/or field programmable gate arrays (FPGAs). ASICS or specially programmed FPGAs can perform various functions required of the system processor. In some embodiments, the system, or the processing elements thereof, may include a combination of general purpose processors, ASICs, DSPs and/or FPGAs. In some embodiments, image enhancement functionality, as further described below, may be distributed across multiple processing elements.

Furthermore, one skilled in the art will recognize that when reference is made to performing operations first on columns then on rows, the order of operations can be reversed such that rows are processed before columns with minimal modification. In addition, such embodiments need not be limited to row or column arrangements. Other grouping arrangements for processing and analysis are contemplated within the scope of the present invention.

Central Processor System

Figure 2:
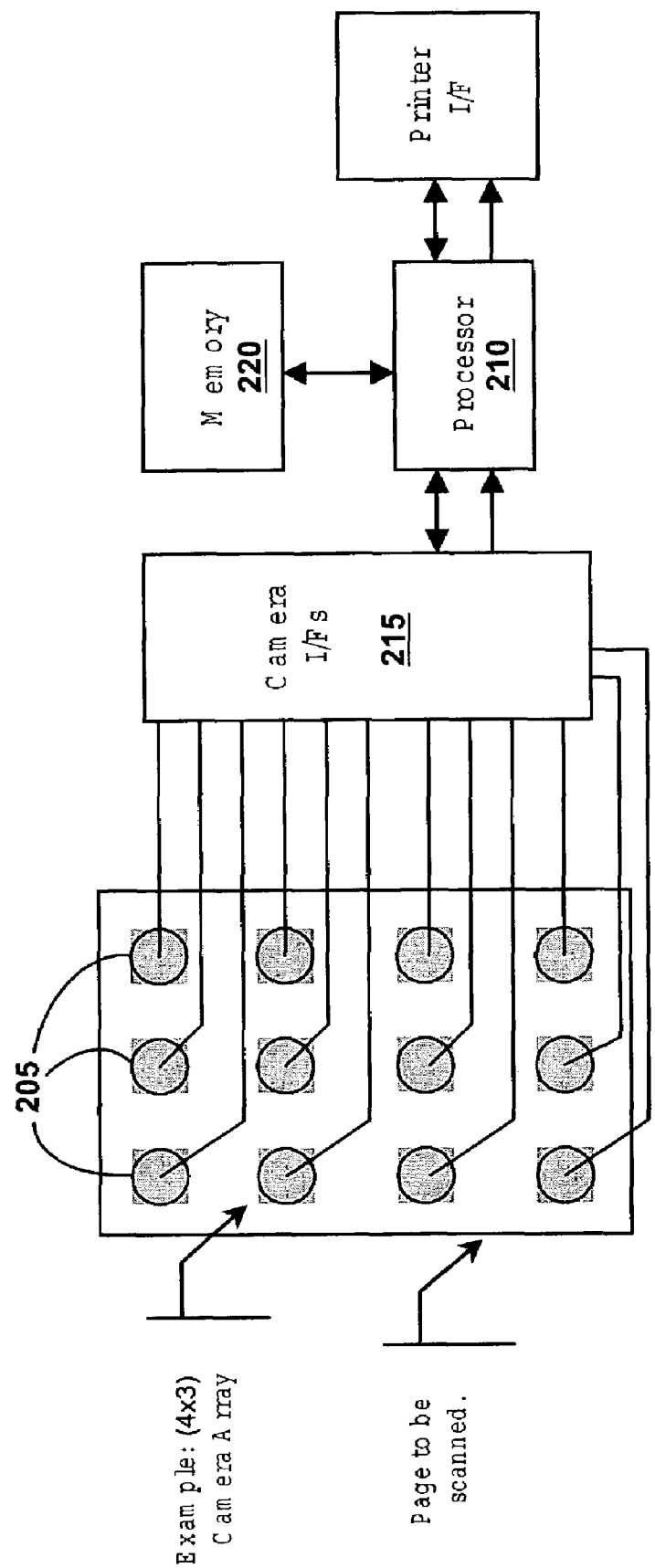
FIG. 2 depicts an embodiment including multiple imaging elements communicating with a system processor with one or more centralized processing elements.

In some embodiments, one central processing element 210 manages all M×N possible imaging elements 205 via a suitable interface 215. After image acquisition by the individual imagers 205, the images can be recombined together in a serial fashion. Feature extraction can then be performed. Central processing element 210 can use memory 220 for the combination process as well as other image manipulations. One such exemplary system is depicted in FIG. 2. In some embodiments, after feature and parameter extraction have been performed, spatial unwarping can then be performed and nonuniform lighting effects can be corrected. The output of this state can be further processed for background removal, text/image segmentation and enhancement before final output. Additional image processing can be performed as appropriate. Such an approach is described in greater detail in commonly assigned U.S. patent application Ser. No. 10/224,660, filed Aug. 20, 2002, entitled "Systems and Methods for Content-Based Document Enhancement"; the content of which is hereby incorporated by this reference herein for all purposes.

Balanced System

Figure 3:
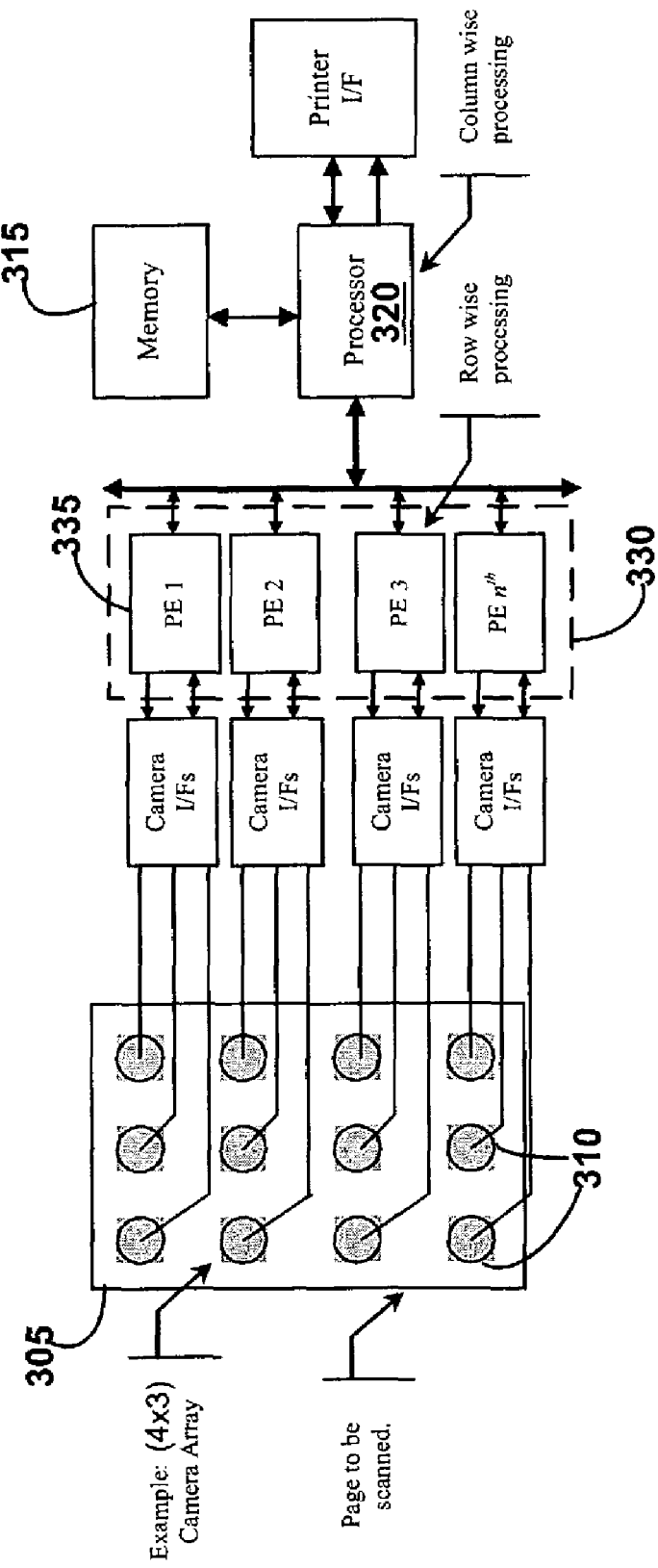
FIG. 3 depicts an embodiment including one or more processing elements per row of imaging elements.

In other exemplary embodiments, some parallelism can be exploited based on imaging elements rows. As a non-limiting example, a 4×3 camera acquisition matrix 305 can be formed with individual processor elements 335 dedicated for each imaging element matrix row. One such exemplary system is depicted in FIG. 3. Each processing element 310 can include one or more DSPs, ASICs, FPGAs, general purpose processors or other processing units. Memory storage 315 can also be incorporated locally, and/or as a shared memory space. Each processing element 335 can perform the various tasks including, but not limited to, group-wise recombination, distortion correction, and illumination compensation. As shown in FIG. 3, a PE can be partitioned to process different rows of imaging elements 310. PEs can efficiently recombine the images from the output data from each band of data from the imaging elements. Thus, the amount of local and band image/data processing that can be performed is dependent on the performance of each PE. This sets the granularity of the image processing operations. The column-wise processing element 320 can perform recombination of the bands in the vertical direction of corrected data from the row wise PEs 330. In addition to image data, statistics can be passed on to the next processing stage. The next stage of processing can apply further corrections and enhancements as necessary across the bands. Additional stages of processing can occur depending upon the granularity and performance of the PEs and imaging elements. The row and column processing described above was selected as exemplary; other embodiments can selectively process in other, sometimes user configurable, groupings of imaging elements.

Full Parallel System

Figure 4:
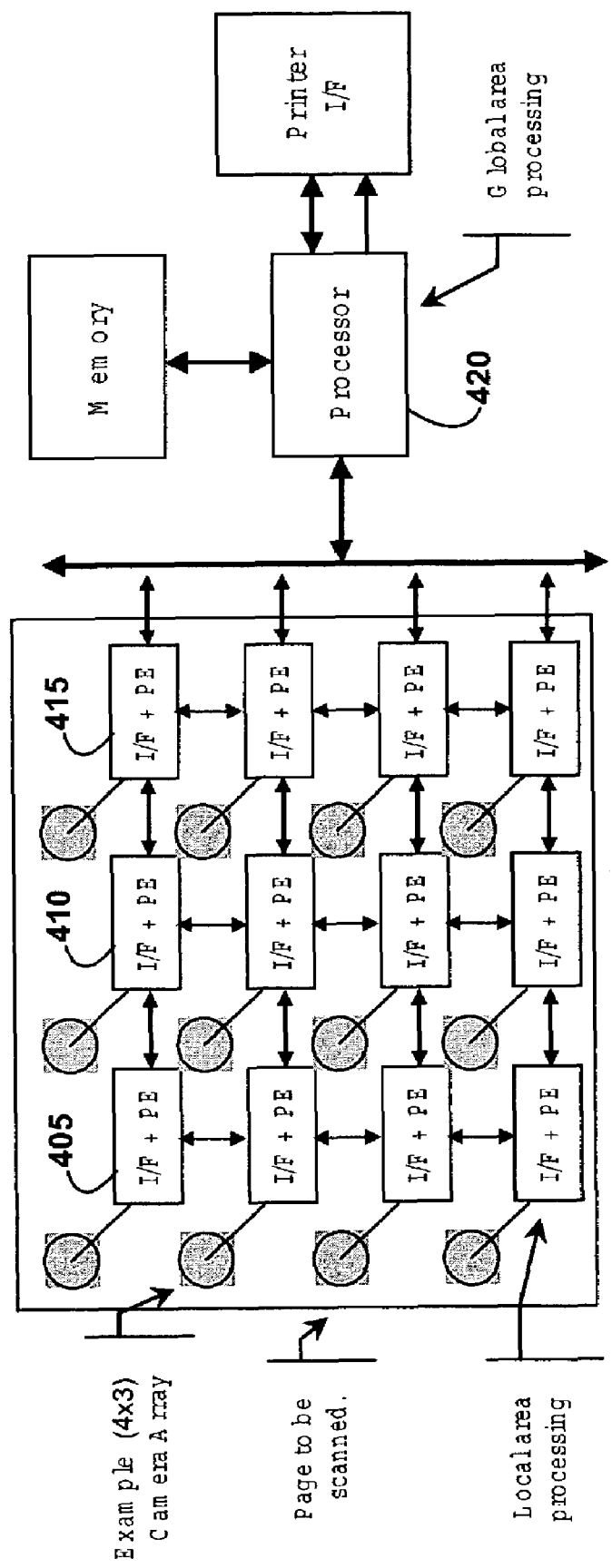
FIG. 4 depicts a full parallel embodiment including one or more processing elements per imaging element.

In some other exemplary embodiments, each imaging element can have its own processing element, or elements. These processing elements can be of lower performance than those of the two previous sets of exemplary embodiments. Such embodiments readily support image recombination because each imaging element output can be passed through any neighbor. An exemplary system is depicted in FIG. 4. As a non-limiting example, the processing element on the top left 405 can initiate a block transfer to its neighbor on its right 410 and the data can thereby propagate through its neighbor 410. The block transfers are not limited to left and right neighbors but can also transfer to its neighbor above and below. As one skilled in the art will recognize, other directions of data transfer, including diagonal, can be implemented. The neighbor can then correlate the incoming data for overlapping regions and recombine the incoming image with its own internal image. This process can be repeated as many times as necessary as data is transported from left to right. The farthest right neighbor 415 performs the same functions before it transports the data to a global area processing element or elements 420. The global area processing element 420 can then apply additional corrections and enhancements to the whole image. In some embodiments, localized statistical information can be generated and/or distributed. This allows for better image processing and correction of the data. If processing element communication between upper and lower rows of elements is not implemented, then the global area processing element can be used to recombine together the multiple horizontal image strips.

In some embodiments, a hierarchical processing organization can be used. For example, in some embodiments using lower resolution central imaging elements, locally processed subimages can be passed to the processing element of the lower resolution central imager for joining and potential propagation to a further lower resolution central imaging element. Document recombination, or stitching, can be achieved by resampling the subimage to reduce its resolution to that of the lower resolution image and then finding its position on the lower resolution image by repeatedly shifting and computing the correlation of the subimage with the lower resolution image. Alternatively, the image joining process described in considered U.S. Pat. No. 4,393,410, issued to Ridge et al. can be employed. The content of this disclosure is hereby incorporated herein by this reference.

Image Processing Methods and Algorithms

Figure 5:
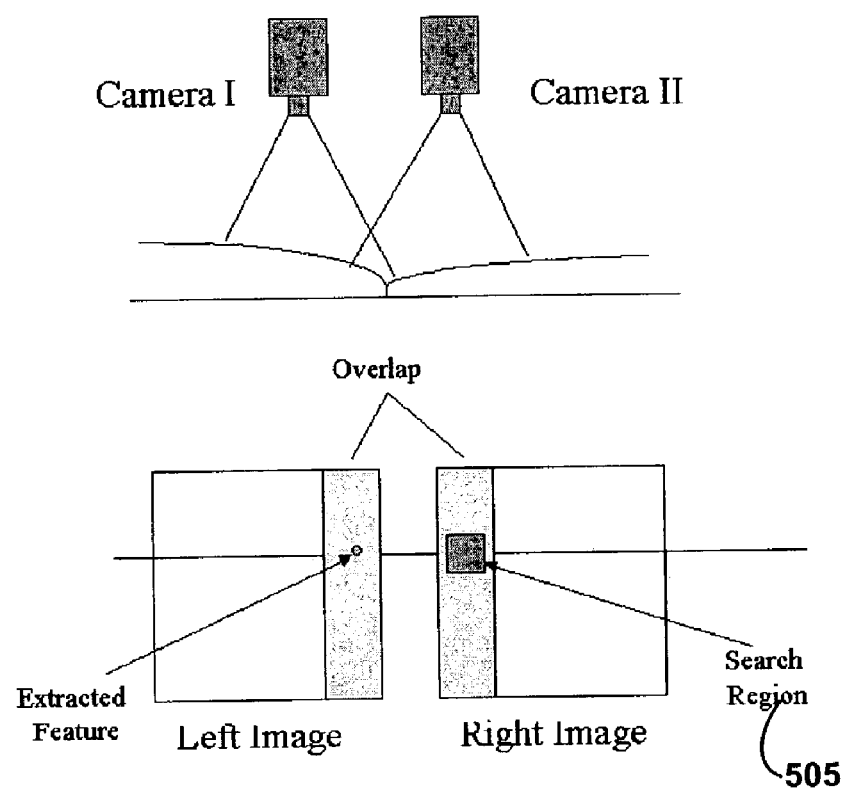
FIG. 5 depicts the registration of a pair of images taken by two imaging elements.

According to one embodiment, the image processing methods and algorithms of the present invention have the ultimate purpose of collecting and recombining together the images produced by each imaging element. One skilled in the art will realize the methods and algorithms described below can be applied to any of the three processing schemes described above. In an exemplary embodiment, registration of a pair of images commences by extraction of some features in the overlapping region and the matching of these features in both images. An exemplary process is shown in FIG. 5. In one embodiment, edges are used as the relevant feature set. Since the positions of the imaging elements can be determined, the search area 505 can be of a small size. Edges provide important information about details in the image. Once edges in the overlapping regions have been extracted, images can be stitched together by matching edges from one image to its neighboring images. This can be done using template matching or correlation techniques.

In one embodiment, template matching can be used to perform pattern classification. In this process, the edges of one image, or template, are moved to possible positions in a second image. The number of matches (edge pixels in the template that are matching those in the second image) can be counted. The maximum correlation approach picks the position that has the maximum number of matches. The minimum error approach counts the number of mismatches and picks the position with the minimum number of mismatches. As one skilled in the art will recognize, other methods of image matching may be used.

Figure 7:
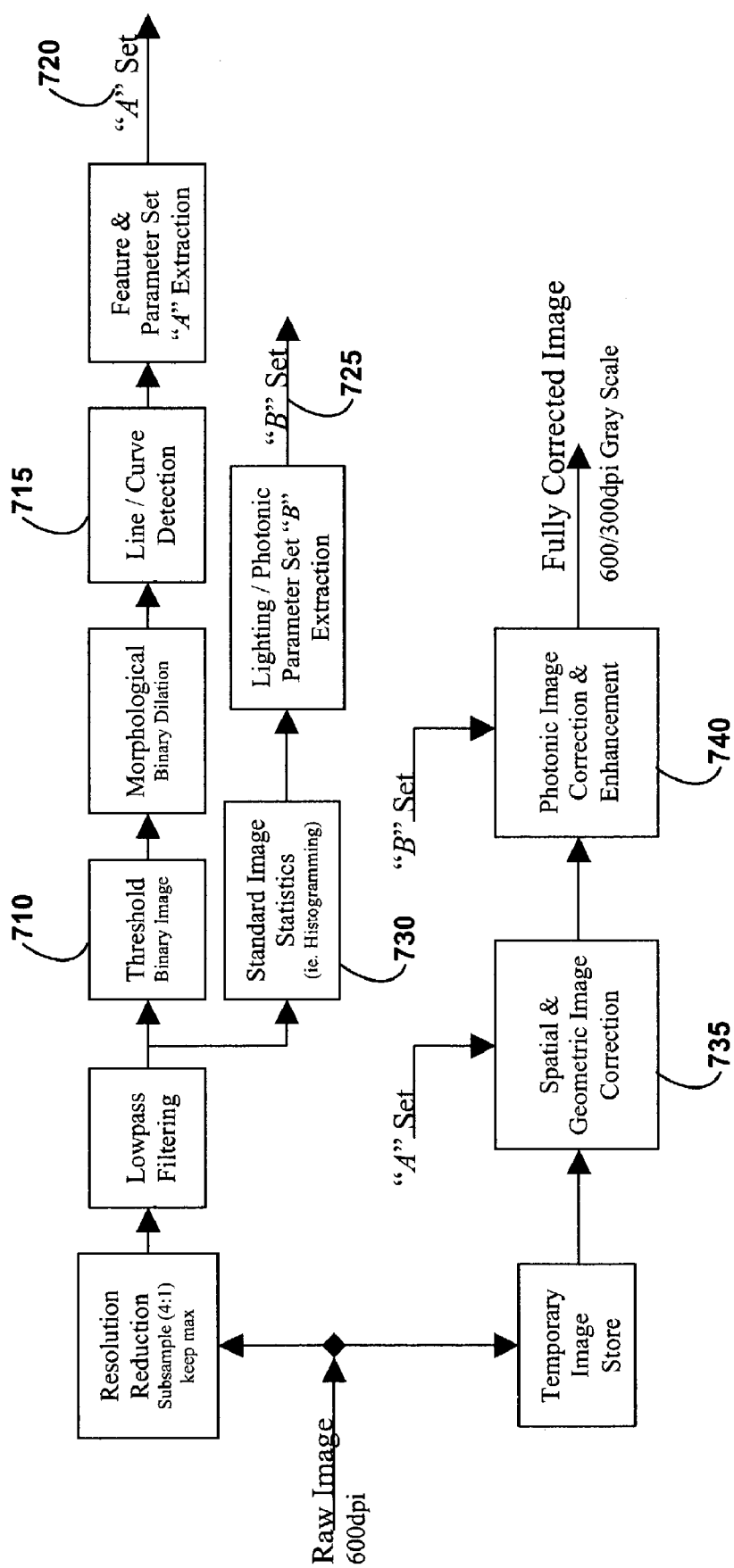
FIG. 7 depicts a block diagram for an exemplary image processing architecture.

An exemplary image processing system overview and architecture are shown in FIGS. 6 and 7, respectively. Once the registration process is complete, the image can then be processed to correct for any geometrical and spatial distortions in addition to illumination adjustment and output quality improvement. This processing can be accomplished by extraction of A and B feature sets.

"A" Parameter Set

The A set are parameters extracted from the recombined image to determine the orientation and correct for distortions. One skilled in the art will recognize the following three steps as exemplary and that individual steps may be removed or combined with other steps.

I. Blurring

The image can be blurred using a 3×3 kernel to remove noise and suppress moire. This step can be useful in the subsequent binarization of the image. In one embodiment, the kernel can be of the following form:

$$K_{sm} = \frac{1}{9}\begin{bmatrix} 1 & 1 & 1 \\ 1 & 1 & 1 \\ 1 & 1 & 1 \end{bmatrix} \quad (1)$$

II. Image Thresholding

The image can be thresholded 710 using dynamic thresholds to extract the text and images. In one exemplary embodiment, a local adaptive threshold is used. It has been found that a local adaptive threshold can be more effective in separating text/images from background since images captured with an imaging element generally have fluctuating luminance and therefore cannot be binarized optimally. III. Line curve detection Once the image is binarized, a line detection algorithm can be applied 715 to determine the orientation and distortion of the page. In one exemplary embodiment, this can be done by convolving the image with a set of nine masks that represent bases for edge, line, and average subspaces. Other methods of determining the orientation and distortion can be used as appropriate. The resulting responses at a pixel are treated as components of a vector. Projecting this vector onto the edge and line subspaces indicates the relative "edgeness" of "lineness" at a point. The slope and direction of these lines constitute the A parameter set 720.

"B" Parameter Set

Following processing for the A parameter set, the B parameter set 725 can be processed. This step can include the extraction of a feature vector that describes the gray level distribution of the image 730. The components of the feature vector can include gray values, filtered gray values, texture measures, Markov random field features, fractal dimension measures, gradient magnitudes and directions, and/or other known components. In one exemplary embodiment, the feature vector can be constructed from statistical measurements obtained from image histogram and directional edge information. This feature set can be useful in segmenting the page into text, graphics and background. Each component can be enhanced appropriately.

Image Correction

Using the A set parameters, an image can be warped to correct for geometrical and spatial distortions 735. Image warping is the act of distorting a source image into a destination image according to a mapping function between source space (u, v) and destination space (x, y). The mapping can be specified by the functions x(u, v) and y(u, v). Different types of mapping can be implemented in the instant invention, such as piecewise, bilinear, biquadratic, and/or bicubic. Other types of mapping can be used as appropriate. Such mappings can be parameterized by a grid of control points.

Image warping can also be done in a multi-resolution scheme. One advantage of this approach is that features that might be undetected at one resolution may be readily detected at another resolution. Additionally, since fewer details are present at low resolution, the matching process can be computationally less expensive. In one embodiment, at least one low resolution image can be acquired representing a large portion of a document. This image can function as a guidance map. The details of the document can be captured using a set of overlapping high-resolution images. The lower resolution image can be used as a map to guide the stitching process. This can be accomplished by converting the high resolution images into lower resolution images using subsampling or a more involved process such as wavelet transforms. The A set can be extracted from the resulting images and can be compared with an image obtained from the low-resolution map. This registration step can provide an initial estimate of the position of the images with respect to the whole document. In some embodiments, fine adjustments can be performed at higher resolutions.

The B set can be used to enhance the output image 740. These enhancements can include, but are not limited to, background suppression, noise removal, and sharpening of text. Eliminating substantially all background gray values can improve the quality of the scanned image. In some embodiments, different filters can be applied to different document components as follows:

a) If the pixel is classified as text in the B set, the following sharpening kernel $K_{sh}$, can be applied:

$$K_{sh} = \begin{bmatrix} -1 & -1 & -1 \\ -1 & 9 & -1 \\ -1 & -1 & -1 \end{bmatrix} \quad (2)$$

b) If the pixel is classified as image in the B set, the following smoothing kernel, $K_{sm}$, can be applied:

$$K_{sm} = \frac{1}{9}\begin{bmatrix} 1 & 1 & 1 \\ 1 & 1 & 1 \\ 1 & 1 & 1 \end{bmatrix} \quad (3)$$

One skilled in the art will recognize that other filters and/or kernels can be used as appropriate.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. An image generation system, the system comprising:
   a) a plurality of imaging elements, the plurality of imaging elements being arranged in a 2 dimensional matrix, wherein at least one imaging element of the plurality generates or can be configured to generate image data at a resolution different from at least one other imaging element;
   b) a system processor comprising one or more processing elements, the one or more processing elements programmed or adapted to combine images from the plurality of imaging elements or from a subset thereof; and
   c) an illumination system comprising one or more illumination elements, wherein the illumination system is integrated with the matrix of imaging elements.

2. The system of claim 1, wherein each of the one or more illumination elements is associated with a group of one or more imaging elements in the matrix.

3. The system of claim 2, wherein a one-to-one correspondence exists between imaging elements and illumination elements.

4. The system of claim 1, wherein the plurality of imaging elements are arranged in a 2×N or an N×2 matrix, where N is an integer greater than or equal to one.

5. An image generation system, the system comprising:
   a) a plurality of imaging elements, wherein at least one imaging element of the plurality generates or can be configured to generate image data at a resolution different from at least one other imaging element, and wherein at least one of the imaging elements is mounted at an angle with respect to a substantially planar surface for supporting an object to be imaged that is different from a mounting angle of at least one other imaging element; and
   b) a system processor comprising one or more processing elements, the one or more processing elements programmed or adapted to combine images from the plurality of imaging elements or from a subset thereof.

6. An image generation system, the system comprising:
   a) a plurality of imaging elements, wherein at least one imaging element of the plurality generates or can be configured to generate image data at a resolution different from at least one other imaging element, and wherein at least one of the imaging elements is mounted or adapted to allow angling of the at least one imaging element with respect to a substantially planar surface for supporting an object to be imaged; and
   b) a system processor comprising one or more processing elements, the one or more processing elements programmed or adapted to combine images from the plurality of imaging elements or from a subset thereof.

7. The system of claim 6, wherein each of the imaging elements is mounted or adapted to allow angling.

8. The system of claim 6, and further comprising an angle control interface in communication with the at least one angelable imaging element, wherein the angle control interface controls the angling of the at least one angelable imaging element.

9. The system of claim 8, wherein the at least one angelable imaging element comprises a plurality of angelable imaging elements and wherein the angle control interface is configured or adapted to independently control angling of each imaging element in the plurality of angelable imaging elements.

10. The system of claim 8, wherein the at least one angelable imaging element comprises a plurality of angelable imaging elements, wherein each of the plurality of angelable imaging elements is associated with a group of one or more angelable imaging elements and wherein the angle control interface is programmed or adapted to independently control angling of each group of angelable imaging elements.

11. The system of claim 8, wherein the angle control interface receives parameters associated with an imaging task and automatically controls angling of the at least one angelable imaging element.

12. The system of claim 6, wherein the system processor combines images based on matched edges.

13. The system of claim 12, wherein the plurality of imaging elements are arranged in a 2 dimensional matrix.

14. The system of claim 13, wherein the plurality of imaging elements are arranged in a 2×N or an N×2 matrix, where N is an integer greater than or equal to one.

15. The system of claim 12, wherein the plurality of imaging elements are arranged in one or more concentric circles.

16. The system of claim 12, wherein each imaging element comprises a CMOS or CCD imager.

17. The system of claim 16, wherein each imaging element further comprises focusing optics.

18. The system of claim 12, wherein the system processor is further programmed or adapted to perform image correction on the combined image.

19. The system of claim 18, wherein the system processor is programmed or adapted to perform image correction by performing one or more image correction tasks selected from the group consisting of correction of geometric anomalies, illumination compensation, image enhancement, background removal and combinations thereof.

20. The system of claim 19, wherein the one or more image corrections tasks comprises correction of geometric anomalies and wherein the geometric anomalies corrected include curvature artifacts.

21. The system of claim 12, and further comprising an illumination system comprising one or more illumination elements.

22. The system of claim 12, further comprising a system data store and wherein the system processor is further programmed or adapted to store acquired image data in the system data store.

23. The system of claim 12, wherein the system processor is further programmed or adapted to combine partial images upon receipt of a request.

24. The system of claim 23, wherein the request comprises imaging element subset selection or cropping parameters to automate the same.

25. The system of claim 23, wherein the request includes an image correction selection.

26. The system of claim 25, further comprising a user interface allowing entry of a parameter by a user.

27. An image generation system, the system comprising:
 a) a plurality of imaging elements, wherein at least one imaging element of the plurality generates or can be configured to generate image data at a resolution different from at least one other imaging element, and wherein a central imaging element has an area of view covering a first portion of the scan surface at a first resolution and at least one additional imaging element has an area of view covering a second portion of the scan surface at a second resolution; and
 b) a system processor comprising one or more processing elements, the one or more processing elements programmed or adapted to combine images from the plurality of imaging elements or from a subset thereof, and wherein the system processor is further programmed or adapted to recombine a first subimage with a second subimage by finding the location of the first subimage in a lower resolution image comprising the second subimage through a registration technique.

28. The system of claim 27, wherein the plurality of imaging elements are arranged in a 2 dimensional matrix.

29. The system of claim 28, wherein the plurality of imaging elements are arranged in a 2×N or an N×2 matrix, where N is an integer greater than or equal to one.

30. The system of claim 27, wherein each imaging element comprises a CMOS or CCD imager.

31. The system of claim 30, wherein each imaging element further comprises focusing optics.

32. The system of claim 27, wherein the system processor is further programmed or adapted to perform image correction on the combined image.

33. The system of claim 32, wherein the system processor is programmed or adapted to perform image correction by performing one or more image correction tasks selected from the group consisting of correction of geometric anomalies, illumination compensation, image enhancement, background removal and combinations thereof.

34. The system of claim 33, wherein the one or more image corrections tasks comprises correction of geometric anomalies and wherein the geometric anomalies corrected include curvature artifacts.

35. The system of claim 27, wherein the plurality of imaging elements are arranged in one or more concentric circles.

36. The system of claim 27, wherein the system processor is further programmed the system processor is further programmed or adapted to store acquired image data in the system data store.

37. The system of claim 27, wherein the system processor is further programmed or adapted to combine partial images upon receipt of a request.

38. The system of claim 37, wherein the request comprises imaging element subset selection or cropping parameters to automate the same.

39. The system of claim 37, wherein the request includes an image correction selection.

40. The system of claim 29, further comprising a user interface allowing entry of a parameter by a user.

41. A method for generating an image, the method comprising the steps of:
 a) receiving image data from a plurality of imaging elements, wherein the received image data from at least one imaging element is at a resolution different from received image data of a second imaging element;
 b) generating an image based on image data received from the at least one imaging element and the second imaging element; and
 c) angling a subset of the plurality of imaging elements.

42. The method of claim 41, further comprising the step of angling each of the plurality of imaging elements.

43. The method of claim 41, further comprising the step of receiving a control signal comprising angling information for use in the angling step.

44. An image generation system, the system comprising:
 a) a plurality of imaging means for generating image data representative of an area of view, wherein at least one of the plurality has an area of view that differs from at least one other and wherein each imaging means comprises focus means for focusing on its area of view;
 b) means for combining image data representative of a first area of view by reference to image data representative of a second area of view based on matched edges;
 c) means for illumination comprising one or more illumination elements;
 d) means for integrating and associating the one or more illumination elements with one or more of the plurality of imaging means;
 e) angling means for angling at least one of the plurality of imaging means;
 f) means for controlling the angling means; and
 g) means for controlling the focusing means of at least one of the plurality of imaging means.

45. A method for generating an image, the method comprising the steps of:
 a) receiving image data from a plurality of imaging elements wherein at least one imaging element generates, or can be configured to generate, image data at a resolution different from a second imaging element;
 b) generating an image based on image data received from the at least one imaging element and the second imaging element based on matched edges;
 c) illuminating an object with one or more illumination elements;
 d) angling the one or more imaging elements;
 e) controlling the angling of the imaging elements; and
 f) focusing one or more of the imaging elements.

46. An image generation system, the system comprising:
 a) a plurality of imaging elements, wherein at least one of the imaging elements is mounted or adapted to allow angling of the at least one imaging element;
 b) a system processor comprising one or more processing elements, the one or more processing elements programmed or adapted to combine images from the plurality of imaging elements or from a subset thereof; and
 c) an angle control interface in communication with the at least one angelable imaging element, wherein the angle control interface controls the angling of the at least one angelable imaging element.

47. The system of claim 46, wherein the at least one angelable imaging element comprises a plurality of angelable imaging elements and wherein the angle control interface is configured or adapted to independently control angling of each imaging element in the plurality of angelable imaging elements.

48. The system of claim 46, wherein the at least one angelable imaging element comprises a plurality of angelable imaging elements, wherein each of the plurality of angelable imaging elements is associated with a group of one or more angelable imaging elements and wherein the angle control interface is programmed or adapted to independently control angling of each group of angelable imaging elements.

49. The system of claim 46, wherein the angle control interface receives parameters associated with an imaging task and automatically controls angling of the at least one angelable imaging element.

* * * * *